US011447713B2

(12) United States Patent
Mueller-Cristadoro et al.

(10) Patent No.: US 11,447,713 B2
(45) Date of Patent: Sep. 20, 2022

(54) HYPERBRANCHED POLYESTERS AND THEIR USE AS WAX INHIBITOR, AS POUR POINT DEPRESSANT, AS LUBRICANT OR IN LUBRICATING OILS

(71) Applicant: BASF SE, Ludwigshafen am Rhein (DE)

(72) Inventors: Anna Maria Mueller-Cristadoro, Lemfoerde (DE); Edward Bohres, Ludwigshafen am Rhein (DE); Stefan Frenzel, Ludwigshafen am Rhein (DE); Xiao Fu, Singapore (SG); Felix Alexander Westerhaus, Hanau (DE); Tina Noack, Lampertheim (DE); Radoslaw Kierat, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/042,208

(22) PCT Filed: Mar. 19, 2019

(86) PCT No.: PCT/EP2019/056830
§ 371 (c)(1),
(2) Date: Sep. 28, 2020

(87) PCT Pub. No.: WO2019/185401
PCT Pub. Date: Oct. 3, 2019

(65) Prior Publication Data
US 2021/0017466 A1 Jan. 21, 2021

(30) Foreign Application Priority Data
Mar. 26, 2018 (EP) .................... 18163934

(51) Int. Cl.
| | | |
|---|---|---|
| *C10M 145/22* | (2006.01) | |
| *C08G 83/00* | (2006.01) | |
| *C10M 169/04* | (2006.01) | |
| *C08G 63/664* | (2006.01) | |
| *C10N 20/00* | (2006.01) | |
| *C10N 30/02* | (2006.01) | |

(52) U.S. Cl.
CPC ......... *C10M 145/22* (2013.01); *C08G 63/664* (2013.01); *C08G 83/005* (2013.01); *C10M 169/041* (2013.01); *C10M 2203/003* (2013.01); *C10M 2209/102* (2013.01); *C10N 2020/075* (2020.05); *C10N 2030/02* (2013.01)

(58) Field of Classification Search
CPC .... C08G 63/48; C08G 63/664; C08G 83/005; C10M 145/22; C10M 169/041; C10M 2203/003; C10M 2209/102; C10N 2020/011; C10N 2020/04; C10N 2020/075; C10N 2030/02; C10N 2030/08
See application file for complete search history.

(56) References Cited

U.S. PATENT DOCUMENTS 6,497,812 B1 12/2002 Schinski

FOREIGN PATENT DOCUMENTS

| | | | | |
|---|---|---|---|---|
| CN | 106700047 A | * | 5/2017 | |
| EP | 0565487 A2 | | 10/1993 | |
| EP | 1557411 A1 | | 7/2005 | |
| GN | 106700047 A | | 5/2017 | |
| WO | 93/17060 A1 | | 9/1993 | |
| WO | WO-9317060 A1 | * | 9/1993 | ......... C09D 201/005 |
| WO | 96/12755 A1 | | 5/1996 | |
| WO | 97/49781 A1 | | 12/1997 | |
| WO | 01/58987 A2 | | 8/2001 | |
| WO | 2006/056578 A1 | | 6/2006 | |
| WO | 2013/019704 A1 | | 2/2013 | |
| WO | 2014/013380 A1 | | 1/2014 | |
| WO | 2015/070121 A1 | | 5/2015 | |

OTHER PUBLICATIONS

Flory, "Molecular Size Distribution in Three Dimensional Polymers. VI. Branched Polymers Containing A-R-B/-r Type Units," J Am. Chem. Soc., (1952), 74, pp. 2718-2723.
Holter et al., "Degree of branching in hyperbranched polymers," Acta. Polymer., 48, (1997), pp. 30-35.
(Continued)

*Primary Examiner* — James C Goloboy
(74) *Attorney, Agent, or Firm* — Faegre Drinker Biddle & Reath LLP

(57) ABSTRACT

The invention relates to a method for the preparation of a hyperbranched polyester mixture obtainable by reacting a hydroxyl group containing carboxylic acid (B) with at least one carboxylic acid group and at least two hydroxyl groups with a diol (C) having a molecular weight of more than 100 g/mol, optionally in the presence of at least one further reactant, wherein the at least one further reactant is a polyol (A) having at least three hydroxyl groups under a reaction condition allowing ester and ether formation; and reacting the mixture resulting from step (a) with a hydrophobic carboxylic acid (D) resulting in the hyperbranched polyester mixture. The invention further relates to said hyperbranched polyester mixture and the use as wax inhibitor, as pour point depressant, as lubricant or in lubricating oils.

20 Claims, No Drawings

(56) References Cited

OTHER PUBLICATIONS

Kabel et al., "Synthesis and evaluation of PAMAM dendrimer and PDPF-a-POP block copolymer as asphaltene inhibitor/dispersant," Res. Chem. Intermed., (2015), 41(1), pp. 457-474.
Katritzky et al., "Synthesis of Dendramines, Dendramides and Their New Application in the Oil Industry," Journal of the Chinese Chemical Society, 1997, 44, pp. 575-580.
Sunder et al., Controlling the Growth of Polymer Trees: Concepts and Perspectives for Hyperbranched Polymers, Chem. Eur. J., 2000, 6(14), pp. 2499-2506.
International Preliminary Report on Patentability received for PCT Patent Application No. PCT/EP2019/056830, dated Jul. 9, 2020, 12 pages.
International Search Report and Written Opinion received for PCT Patent Application No. PCT/EP2019/056830, dated Apr. 18, 2019, 9 pages.

* cited by examiner

HYPERBRANCHED POLYESTERS AND THEIR USE AS WAX INHIBITOR, AS POUR POINT DEPRESSANT, AS LUBRICANT OR IN LUBRICATING OILS

CROSS-REFERENCE TO RELATED APPLICATIONS

This application is a national stage application (under 35 U.S.C. § 371) of PCT/EP2019/056830, filed Mar. 19, 2019, which claims benefit of European Application No. 18163934.5, filed Mar. 26, 2018, both of which are incorporated herein by reference in their entirety.

The present invention relates to a method for the preparation of a hyperbranched polyester mixture obtainable by reacting a hydroxyl group containing carboxylic acid (B) with at least one carboxylic acid group and at least two hydroxyl groups with a diol (C) having a molecular weight of more than 100 g/mol, optionally in the presence of at least one further reactant, wherein the at least one further reactant is a polyol (A) having at least three hydroxyl groups under a reaction condition allowing ester and ether formation; and reacting the mixture resulting from step (a) with a hydrophobic carboxylic acid (D) resulting in the hyperbranched polyester mixture. The invention further relates to said hyperbranched polyester mixture and the use as a wax inhibitor, as pour point depressant, as lubricant or in lubricating oils.

Underground mineral oil formations typically have relatively high temperatures. After the production of the crude oil to the surface, the crude oil produced therefore cools down to a greater or lesser degree depending on the production temperature and the storage or transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, such that the crude oil ceases to flow, even though the predominant portion is still liquid. The lowest temperature at which a sample of an oil still just flows in the course of cooling is referred to as the pour point ("yield point"). For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course of or after production, or else to lower temperatures under corresponding climatic conditions. Crude oils may have pour points above room temperature, such that crude oils of this kind may solidify in the course of or after production.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are also referred to as pour point depressants or flow improvers.

Paraffin inhibitors or wax inhibitors refer to those substances intended to prevent the deposition of paraffins or paraffin waxes on surfaces in contact with crude oils or other wax-containing oils and/or mineral oil products.

One class of chemical compounds which have been suggested as pour point depressants, wax inhibitors, or cold flow improvers comprises dendritic or hyperbranched polymers or derivatives thereof.

WO 96/12755 A1 describes an oil-soluble dendrimer-based cold-flow improver comprising an amine based central core linked through a plurality of polar groups to a dendritic body which is linked through a plurality of polar groups to a hydrocarbyl periphery consisting of n-alkyl groups from 8 to 1000 carbon atoms.

Alan R. Katritzky et al., Journal of the Chinese Chemical Society, 1997, 44, 575-580 describe the synthesis of dendramines and dendramides and their application in the oil industry in particular as wax-inhibitors.

EP 1 557 411 A2 describes a nucleating agent on basis of hyperbranched polymers comprising a hyperbranched core to which $C_8$ to $C_{40}$ alkyl chains are linked via ester-, carbonate-, thioether-, amide-, urethane-, urea-, or —CO—$CH_2CH_2$—NR'-groups. The nucleating agent may be used for improving the cold-flow properties of paraffin containing crude oils, fuels, oils, lubricants or in fat-based fuels.

WO 2006/056578 A1 describes a method for improving the flowability of a mixture that contains wax and other hydrocarbons which comprises adding a hyperbranched polyester amide.

WO 2013/019704 A1 discloses a hydrocarbon flow improver comprising a branched dendritic core having at least 16 terminal hydroxyl groups and wherein at least one of the terminal hydroxyl groups is esterified with at least one carboxylic acid moiety comprising from 6 to 30 carbon atoms. The dendritic core comprises a quaternary carbon center. The document furthermore relates to a method of extracting hydrocarbon fluid from a well comprising the step of adding said fluid improver to the hydrocarbon fluid. WO 2015/070121 A1 discloses the use of the same product as asphaltene inhibitor.

Khadid I. Kabel et al., Research on Chemical Intermediates, 2015, 41 (1), 457-474, describe the synthesis and evaluation of PAMAM dendrimer and PDPF-b-POP block copolymer as asphaltene inhibitor/dispersant.

Reaction products resulting from polyols with polyacrboxylic acids, which can also be used for the preparation of hyperbranched polyesters are also known as lubricants. WO 2014/13380 A1 describes an ester polyol ester prepared by a polyol, a dicarboxylic acid and a monocarboxylic acid.

There is still a need for improved pour-point depressants for crude oil on basis of hyperbranched polymers.

It is therefore an object of the present invention to provide improved pour point depressants for crude oils based on hyperbranched polymers, their preparation and use.

The object is achieved by a method for the preparation of a hyperbranched polyester mixture obtainable by (a) reacting a hydroxyl group containing carboxylic acid (B) with at least one carboxylic acid group and at least two hydroxyl groups with a diol (C) having a molecular weight of more than 100 g/mol, optionally in the presence of at least one further reactant, wherein the at least one further reactant is a polyol (A) having at least three hydroxyl groups under a reaction condition allowing ester and ether formation; and (b) reacting the mixture resulting from step (a) with a hydrophobic carboxylic acid (D) resulting in the hyperbranched polyester mixture.

The object is also achieved by a hyperbranched polyester mixture obtainable by a method of the present invention for the preparation of the hyperbranched polyester mixture.

The object is also achieved by the use of said hyperbranched polyester mixture of the present invention as wax inhibitor, as pour point depressant, as lubricant or in lubricating oils.

Surprisingly it has been found that modifying hyperbranched polymers with chain extenders in form of a diol as mentioned above yields products with a significantly improved performance as pour point depressant for crude oils.

The term "comprising" or "comprised" means to include, whereas "consisting of" or "consist of" means only the components explicitly mentioned.

The method for the preparation of a hyperbranched polyester mixture according to the present invention comprises at least the two steps (a) and (b). Further steps can also be comprised like purification and separation as well as further reaction steps. However, it is preferred that no further reaction steps are included.

In step (a) a hydroxyl group containing carboxylic acid (B) with at least one carboxylic acid group and at least two hydroxyl groups reacts with a diol (C) having a molecular weight of more than 100 g/mol, optionally in the presence of at least one further reactant, wherein the at least one further reactant is a polyol (A) having at least three hydroxyl groups, under a reaction condition allowing ester and ether formation.

Accordingly, in step (a) the reaction mixture consists of acid (B) and diol (C) only or acid (B), diol (C) and polyol (A) only or acid (B), diol (C), polyol (A) and one or more, like one, two, three or four, further reactants other than (A), (B) or (C). However preferably, the reaction mixture in step (a) consist of (A), (B) and (C).

Thus, in a preferred embodiment, in step (a) the hydroxyl group containing carboxylic acid (B) is reacted with the diol (C) and the polyol (A).

The reaction conditions allow formation of ester and ether formation. Accordingly, the hydroxyl group containing carboxylic acid (B) with at least one carboxylic acid group and at least two hydroxyl groups can react with the carboxylic acid group with a hydroxyl group of (B), with a hydroxyl group of (C) and a hydroxyl group of (A)—if present—in order form a carboxylic ester functional group. In addition, hydroxyl groups of (A)—if present—, (B), and (C) can form ether linkages. Since reaction conditions allow formation of ester and ether formation the resulting reaction product from step (a) is a mixture of different carboxylic esters having ether functionalities and thus also the hyperbranched polyester of the present invention is also a mixture.

Preferably, the hyperbranched polyester mixture comprises a polyester showing a partial structure resulting from ether formation of at least one hydroxyl group of polyol (A), if present, with at least one hydroxyl group of diol (C). By way of example, in case (A) is 1,1,1-trimethylolpropane and (C) is of formula HO—R—OH, then it is preferred that the hyperbranched polyester mixture comprises a polyester showing at least one of the following preferred and more preferred partial structures, wherein the dashed line indicates the attachment to the rest of the molecule:

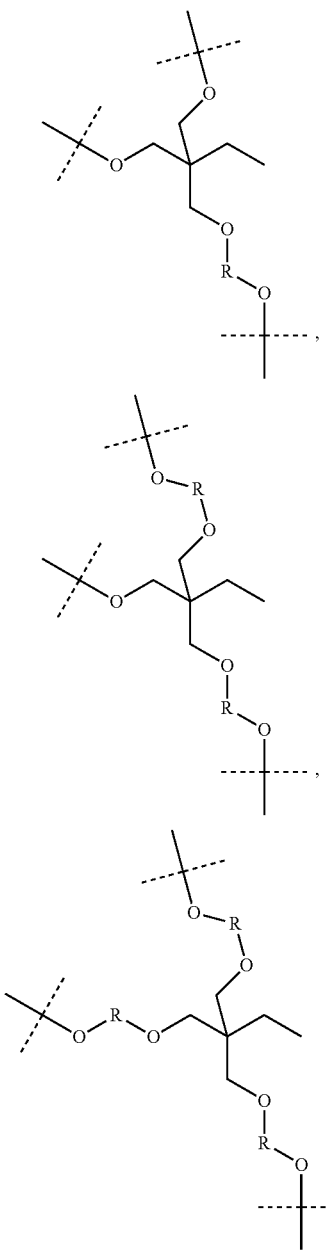

Preferably, the hyperbranched polyester mixture comprises a polyester showing a partial structure resulting from ester formation of at least one hydroxyl group of polyol (A), if present, with the at least one carboxylic acid group of hydroxyl group containing carboxylic acid (B). By way of example, in case (A) is 1,1,1-trimethylolpropane and (B) is dimethylolpropionic acid, then it is preferred that the hyperbranched polyester mixture comprises a polyester showing at least one of the following preferred and more preferred partial structures, wherein the dashed line indicates the attachment to the rest of the molecule:

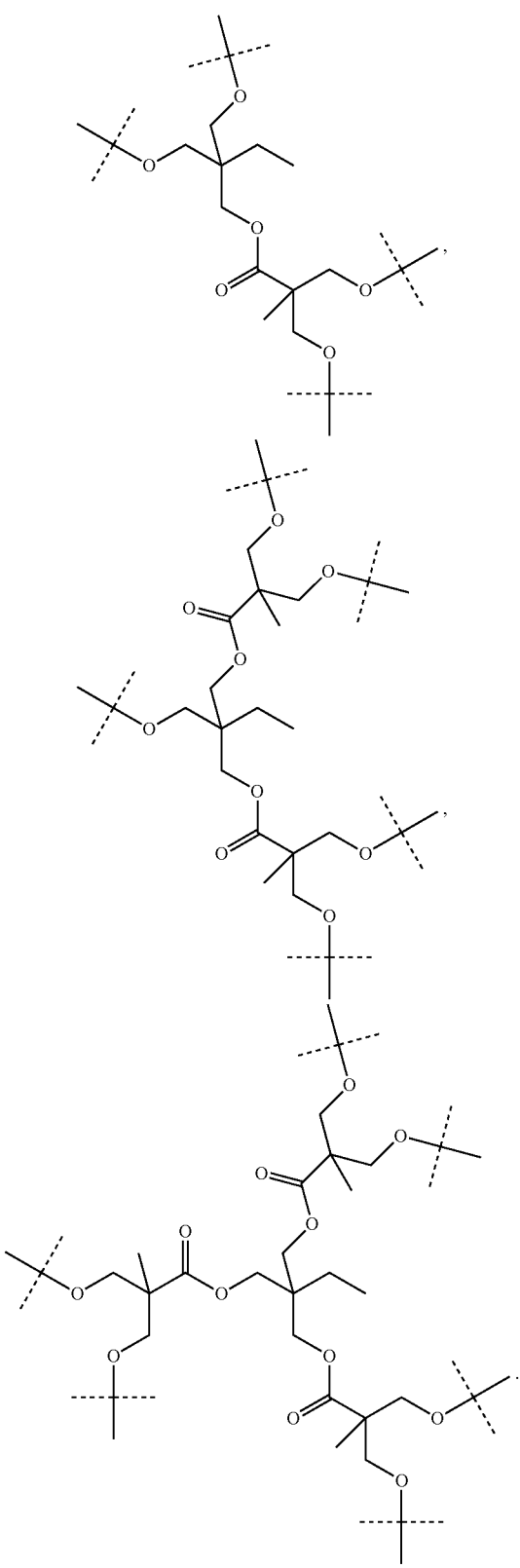

Preferably, the hyperbranched polyester mixture comprises a polyester showing a partial structure resulting from ether formation of at least one hydroxyl group of the hydroxyl group containing carboxylic acid (B) with at least one hydroxyl group of diol (C). By way of example, in case (B) is dimethylolpropionic acid and (C) is HO—R—OH, then it is preferred that the hyperbranched polyester mixture comprises a polyester showing at least one of the following preferred and more preferred partial structures, wherein the dashed line indicates the attachment to the rest of the molecule:

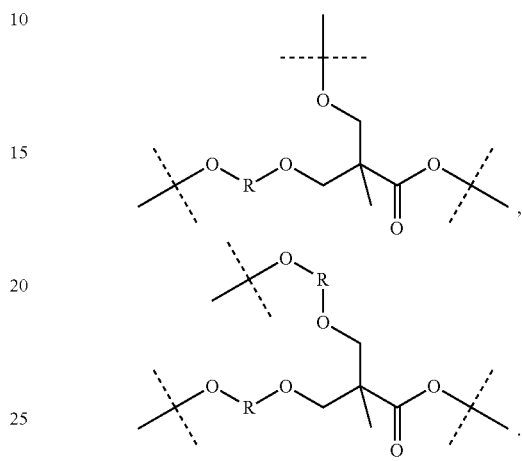

The polyol (A) having at least three hydroxyl groups, is characterized by three, four, five, six or more, preferably three, four, five or six, more preferably three, four or five, even more preferably three or four, even more preferably three hydroxyl groups. The prefix "poly" of "polyol" refers to the number of hydroxyl groups. Polyols (A) are also referred to herein as "at least trifunctional alcohols".

Accordingly, in a preferred embodiment the polyol (A) having at least three hydroxyl groups is a polyol (A) having three hydroxyl groups.

At least trifunctional alcohols (A) which can be reacted include for example the following: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols such as mesoerythritol, threitol, sorbitol, mannitol, for example, or mixtures of the above at least trifunctional alcohols (A). Preference is given to using glycerol, trimethylolpropane, trimethylolethane and pentaerythritol. However, also alkoxylated derivatives of said polyols (A) can be used. Thus, more preferably, the polyol (A) is 1,1,1-trimethylolpropane, glycerol or an alkoxylated derivative of 1,1,1-trimethylolpropane or glycerol, more preferably 1,1,1-trimethylolpropane or glycerol, even more preferably 1,1,1-trimethylolpropane. It is preferred that the polyol (A) does not contain functional groups other than hydroxyl groups. Reference to "a polyol" or "the polyol" also includes mixtures of more than one polyol, which are different as long as the number of hydroxyl groups is at least three. However, it is preferred that only one polyol is used.

The at least trifunctional alcohols (A) which are reacted according to the method of the present invention may have hydroxyl groups each of equal reactivity. Preference is also given here to at least trifunctional alcohols whose OH groups are initially of equal reactivity but in which by reaction with at least one acid group it is possible to induce a drop-in reactivity, caused by steric or electronic influences, among the remaining OH groups. This is the case, for example, when trimethylolpropane or pentaerythritol is used.

The at least trifunctional alcohols (A) which are reacted according to the method of the present invention may also, however, contain hydroxyl groups having at least two chemically different reactivities. The different reactivity of the functional groups may derive either from chemical causes (e.g., primary/secondary/tertiary OH group) or from steric causes. By way of example the polyol (A) may be a triol which contains primary and secondary hydroxyl groups; a preferred example is glycerol.

The hydroxyl group containing carboxylic acid (B) with at least one carboxylic acid group and at least two hydroxyl groups is characterized by one, two, three or more carboxylic acid functional groups and in addition two, three, four, five, six or more hydroxyl groups. Preferably the carboxylic acid (B) is characterized by one or two, preferably one, carboxylic acid group and two or three, preferably two hydroxyl groups. The hydroxyl group containing carboxylic acids (B) are also referred to herein as "oligohydroxycarboxylic acids".

Accordingly, in a preferred embodiment the hydroxyl group containing carboxylic acid (B), with at least one carboxylic acid group and at least two hydroxyl groups, has one carboxylic acid group and at least two hydroxyl groups, more preferably one carboxylic acid group and two hydroxyl groups. The carboxylic acid (B) may have further functional groups but it is preferred that no functional groups are present apart from the above mentioned carboxylic acid and hydroxyl groups.

The oligohydroxycarboxylic acids (B) may comprise aromatic groups or may be aliphatic and preferably are aliphatic.

The hydroxyl groups may be present preferably in the form of hydroxymethyl groups ($-CH_2-OH$).

One example of compounds having precisely one carboxyl acid group which contain more than two hydroxymethyl groups in position 2 relative to the carboxyl group is 2,2,2-tris(hydroxymethyl)acetic acid. An oligohydroxycarboxylic acid of this kind which comprises hydroxyl groups in a form other than that of hydroxymethyl groups is 2,3-dihydroxypropionic acid, for example. Examples of compounds having precisely one carboxyl group and containing more than two hydroxyl groups are sugar acids such as gluconic acid, glucaric acid, glucuronic acid, galacturonic acid or mucic acid (galactaric acid).

Also aromatic dihydroxycarboxylic acids such as 2,4-, 2,6- and preferably 3,5-dihydroxybenzoic acid or 4,4-bis(4-hydroxyphenyl)valeric acid can be used.

Particularly preferred oligohydroxycarboxylic acids (B) are 2,2-bis(hydroxymethyl)alkane-carboxylic acids.

Examples of 2,2-bis(hydroxymethyl)alkanecarboxylic acids that can be employed in accordance with the invention are those having five to twelve carbon atoms, preferably five to seven, more preferably six carbon atoms, such as, for example, 2,2-bis(hydroxymethyl)propionic acid (dimethylolpropionic acid), 2,2-bis(hydroxy-methyl)butyric acid (dimethylolbutyric acid) and 2,2-bis(hydroxymethyl)valeric acid, preferably 2,2-bis(hydroxymethyl)propionic acid (dimethylolpropionic acid) or 2,2-bis(hydroxymethyl)butyric acid (dimethylolbutyric acid) and with particular preference 2,2-bis(hydroxymethyl)butyric acid (dimethylolbutyric acid) and 2,2-dihydroxymethylpropionic acid (dimethylolpropionic acid), even more preferred is dimethylolpropionic acid.

The oligohydroxycarboxylic acids (B) can be used in the form of salts, as ammonium or alkali metal salts, for example, or can be used preferably as free acids. The term "a carboxylic acid (B)" or "the carboxylic acid (B)" also includes a mixture of more than one, like two, three or four, carboxylic acids (B). Furthermore, the term "carboxylic acid (B)" within the meaning of the present invention also includes activated derivatives of the carboxylic acid group, like esters, anhydrides, acid chlorides that can be used for ester formation and which may by more suitable than the unmodified carboxylic acid. However, it is preferred that the carboxylic acid (B) is used as such.

The diol (C) has a molecular weight of more than 100 g/mol. The diol is characterized in that it has two hydroxyl groups, preferably in the form of $-CH_2-OH$.

Diols (C) are for example pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, 2-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n-H$, polypropylene glycols $HO(CH[CH_3]CH_2O)_n-H$, polyTHF $HO-[(CH_2)_4-O]_n-H$ or mixtures of two or more representatives of the above compounds, n being an integer with a value adjusted to meet the molecular weight of the polymer. One or else both of the hydroxyl groups in the aforementioned diols can also be substituted by SH groups. Also activated forms of diols (C) can be used, which can react to form carboxylic esters and/or ethers. The term "a diol (C)" or "the diol (C)" also includes mixtures of two or more diol, especially in case the diol (C) is a polymeric diol. Preference is given to a polymeric diol, preferably a polyether diol, preferably with a number average molecular weight of at least 150 g/mol. Preference is given to polyether diol are polyethylene glycol, polypropylene glycol and polyTHF.

The molecular weight or number average molecular weight for mixtures of diol (C) is more than 100 g/mol, preferably at least 150 g/mol, even more preferably at least 500 g/mol. Preferably the molecular weight or number average molecular weight is at most 10000 g/mol more preferably at most 7500 g/mol, even more preferably at most 5000 g/mol. Thus, preferred ranges are from >100 g/mol to 10000 g/mol, more preferably from 150 g/mol to 10000 g/mol, more preferably from 500 g/mol to 10000 g/mol, even more preferably from 500 to 7500 g/mol, even more preferably from 500 to 5000 g/mol. Exemplary number average molecular weights are 1000 g/mol, 2000 g/mol and 4000 g/mol.

Step (a) of the method of the present invention is preferably carried out in that the starting material is used in that the molar ratio of carboxylic acid (B) and polyol (A), (B):(A), is from 1000:1 to 10:1. More preferably the ratio is 700:1 to 50:1, even more preferably from 500:1 to 75:1, even more preferably from 300:1 to 100:1, even more preferably from 250:1 to 150:1, for example 200:1.

Step (a) of the method of the present invention is preferably carried out in that the starting material is used in that the molar ratio of carboxylic acid (B) and diol (C), (B):(C), is from 1000:1 to 10:1. More preferably the ratio is 700:1 to 25:1, even more preferably from 500:1 to 50:1, even more preferably from 300:1 to 75:1, even more preferably from 200:1 to 100:1, for example 150:1.

The method of the invention is conducted in the presence of a solvent or without solvent. Preferably the reaction in step (a) is carried out without solvent.

Suitable examples of solvents include hydrocarbons such as paraffins or aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene and ortho- and meta-dichlorobenzene. Additional solvents which are especially suitable in the absence of acidic catalysts include the following: ethers such as dioxane or tetrahydrofuran and ketones such as methyl ethyl ketone and methyl isobutyl ketone, for example.

The amount of added solvent may be at least 0.1% by weight, based on the mass of the starting materials to be reacted that are used, preferably at least 1% by weight and more preferably at least 10% by weight. It is also possible to employ excesses of solvent, based on the mass of starting materials to be reacted that are employed, such as from 1.01 to 10 times, for example. Solvent amounts of more than 100 times, based on the mass of starting materials to be reacted that are employed, are not advantageous, since at significantly lower concentrations of the reactants the reaction rate falls markedly, leading to uneconomically long reaction times.

To carry out the method of the invention it is possible to operate in the presence of a water removing additive which is added at the beginning of the reaction. Suitable examples include molecular sieves, particularly molecular sieve 4 Å, $MgSO_4$ and $Na_2SO_4$. It is also possible during the reaction to add further water removing additive or to replace water removing additive by fresh water removing additive. It is also possible to distill off water or alcohol formed during the reaction and to use, for example, a water separator.

The method of the invention can be conducted in the absence of acidic catalysts. It is preferred to operate in the presence of an acidic inorganic, organometallic or organic catalyst or mixtures of two or more acidic inorganic, organometallic or organic catalysts.

Thus, it is preferred that the reaction condition in step (a) comprises acidic conditions, preferably in that the reaction in step (a) is carried out in the presence of an acid.

Acidic inorganic catalysts for the purposes of the present invention include for example sulfuric acid, phosphoric acid, phosphonic acid, hypophosphorous acid, aluminum sulfate hydrate, alum, acidic silica gel (pH=6, in particular =5) and acidic alumina. Also possible for use are, for example, alumium compounds of the general formula $Al(OR)_3$ and titanates of the general formula $Ti(OR)_4$ as acidic inorganic catalysts, the radicals R each being able to be identical or different and being chosen independently of one another from C1-C10-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, iso-amyl, n-hexyl, isohexyl, sec-hexyl, n-heptyl, isoheptyl, n-octyl, 2-ethylhexyl, n-nonyl or n-decyl, C3-C12-cycloalkyl radicals, examples being cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

Preferably the radicals R in $Al(OR)_3$ and $Ti(OR)_4$ are each identical and chosen from isopropyl or 2-ethylhexyl.

Preferred acidic organometallic catalysts are chosen for example from dialkyltin oxides $R_2SnO$, where R is as defined above. One particularly preferred representative of acidic organometallic catalysts is di-n-butyltin oxide, available commercially in the form of oxo-tin.

Preferred acidic organic catalysts are acidic organic compounds containing, for example, phosphate groups, sulfonic acid groups, sulfate groups or phosphonic acid groups. Particular preference is given to sulfonic acids such as para-toluenesulfonic acid, or methanesulfonic acid for example. Acidic ion exchangers can also be used as acidic organic catalysts, examples being polystyrene resins which contain sulfonic acid groups and have been crosslinked with about 2 mol % of divinylbenzene. Particularly preferred is methanesulfonic acid.

Combinations of two or more of the aforementioned catalysts can also be used. Another possibility is to use those organic or organometallic or else inorganic catalysts which are in the form of discrete molecules, in an immobilized form.

If the use of acidic inorganic, organometallic or organic catalysts is desired, the amount of catalyst used in accordance with the invention is from 0.01 to 10% by weight, preferably from 0.1 to 2% by weight, more preferably 0.2 to 1% by weight, each based on the total amount of the reactants.

Step (a) of the method according to the present invention is preferably carried out under an inert gas atmosphere: that is, for example, under carbon dioxide, nitrogen or noble gas, among which argon in particular may be mentioned. Preferably, nitrogen gas is used.

Step (a) of the method of the present invention is preferably conducted at temperatures allowing carboxylic ester and ether formation. Preferably, the reaction condition in step (a) comprises a reaction temperature of more than 80° C., preferably more than 100° C., more preferably more than 120° C., even more preferably more than 140° C. However, the temperature should not exceed 250° C. Thus, a preferred range of reaction temperature is from >80° C. to 250° C., more preferably from >100° C. to 200° C., even more preferably from >120° C. to 180° C. and even more preferably from >140° C. to 170° C.

The pressure conditions in step (a) of the method of the invention are not critical per se. It is possible to operate at a considerably reduced pressure, at from 10 to 500 mbar, for example. The method of the invention can also be conducted at pressures above 500 mbar. For reasons of simplicity it is preferred to carry out the reaction at atmospheric pressure, although it can also be carried out at a slightly elevated pressure, up to 1200 mbar, for example. Working under a significantly increased pressure is a further possibility, at pressures up to 10 bar, for example. Reaction at atmospheric pressure is preferred.

The reaction time of the method of the invention is usually from 10 minutes to 48 hours, preferably from 30 minutes to 24 hours and more preferably from 1 to 16 hours.

After the end of the reaction of step (a) the high-functionality hyperbranched polyesters can be isolated easily, for example, by removing the catalyst by filtration and concentrating the filtrate, usually under reduced pressure. Further highly suitable workup methods include precipitation following the addition of water and subsequent washing and drying. However, it is preferred that step (b) is carried out directly, without said isolating steps.

In step (b) of the method of the present invention the mixture resulting from step (a) is reacted with a hydrophobic carboxylic acid (D) resulting in the hyperbranched polyester mixture of the present invention.

The hydrophobic carboxylic acid (D) can be used as such or in the form of a salt or in activated form as described for the carboxylic acid (B) and also as single compound or as a mixture of different acids (D). Accordingly the term "carboxylic acid (D)" according to the present invention also encompasses salts or activated forms thereof.

The reaction mixture of step (a) represents a hyperbranched polyester comprising terminal OH groups, which are modified in step (b) by reacting at least one of the terminal OH-groups with carboxylic acid (D). Preferably, at least 30% of the terminal OH groups are converted into hydrophobically modified groups, more preferably at least 50% and more preferably at least 75%.

Preferably, the hydrophobic carboxylic acid (D) is represented by the formula $R^h$—COOH, wherein $R^h$ is a hydrocarbon radical with at least 6, preferably 8, more preferably at least 10 carbon atoms. More preferably, $R^h$ is an aliphatic, linear or branched, saturated or unsaturated, aromatic or non-aromatic hydrocarbon group having 8 to 100 carbon atoms, preferably 10 to 32 carbon atoms, more preferably 12 to 26, for example 16 to 22 carbon atoms.

Aliphatic groups $R^h$ may be selected from linear, saturated hydrocarbon groups $R^{ha}$, linear, unsaturated hydrocarbon groups $R^{hb}$, branched, saturated hydrocarbon groups $R^{hc}$, and branched, unsaturated hydrocarbon groups $R^{hd}$.

Examples of saturated linear aliphatic hydrocarbon groups $R^{ha}$ comprise n-octyl-, n-nonyl-, n-decyl-, n-undecyl-, n-dodecyl-, n-tridecyl-, n-tetradecyl-, n-pentadecyl-, nhexadeycl-, n-heptadecyl-, n-octadecyl-, n-nonadecyl-, n-eicosyl-, n-heneicosyl-, ndocosyl-, n-tricosyl-, n-tetracosyl-, n-pentacosyl- or n-hexacosyl groups, or mixtures thereof. In a preferred embodiment, $R^{ha}$ linear saturated aliphatic hydrocarbon group having an even number of carbon atoms from 12 to 26 carbon atoms or mixtures thereof.

Linear unsaturated aliphatic hydrocarbon groups $R^{hb}$ may comprise one or more than one ethylenically unsaturated groups. Examples of unsaturated linear aliphatic hydrocarbon groups comprise in particular groups derived from naturally occurring fatty acids such as palmitoleic acid, oleic acid, elaidic acid, eruic acid, linolenic acid, or arachidonic acid.

Branched aliphatic, saturated hydrocarbon groups $R^{hc}$ are preferably groups derived from oxo alcohols or from Guerbet alcohols. Examples comprise 2-ethyl hexyl-, 3-propylheptyl groups, 4-butylnonyl or C17 alkyl groups with a mean degree of branching (iso-index) between 2.0 and 4.0, preferably between 2.8 to 3.7.

The skilled artisan may select suitable groups $R^h$. In one embodiment the groups $R^h$ are groups $R^{ha}$ having 8 to 100 carbon atoms, preferably 10 to 40 carbon atoms, more preferably 16 to 40, for example 16 to 28 carbon atoms. In a preferred embodiment, $R^{ha}$ is an n-octadecyl group.

In one embodiment the groups $R^h$ are groups $R^{hb}$ having 8 to 100 carbon atoms, preferably 10 to 32 carbon atoms, more preferably 12 to 26, for example 16 to 22 carbon atoms.

In one embodiment the groups $R^h$ are groups $R^{hc}$ having 8 to 100 carbon atoms, preferably 10 to 32 carbon atoms, more preferably 12 to 26, for example 16 to 22 carbon atoms.

In one embodiment of the invention at least two different groups $R^h$ are selected.

In an embodiment the groups $R^h$ comprise at least one group $R^{ha}$ and at least one group $R^{hb}$. The proportion $R^{ha}/R^{hb}$ may be from 1:10 to 10:1, preferably from 1:2 to 2:1. In another embodiment the groups $R^h$ comprise at least one group $R^{ha}$ and at least one group $R^{hc}$. The proportion $R^{ha}/R^{hc}$ may be from 1:10 to 10:1, preferably from 1:2 to 2:1.

As explained above the term "carboxylic acid (D)" also includes activated forms thereof, like carboxylic acid ester groups, carboxylic acid chloride groups, or carboxylic acid anhydrides, or isocyanate groups. Examples of carboxylic acid ester groups include in monoalkylesters with methanol, ethanol, n-propanol, isopropanol, n-butanol, isobutanole, tert-butanol, pentanol, or hexanol, in preferably ethyl esters. Examples of carboxylic acid anhydrides comprise polyisobutene succininc acid anhydrides (PIBSA), e.g. PIBSA having an Mn of 500 to 1500 g/mole.

Accordingly, the carboxylic acid (D) is preferably a carboxylic acid formula $R^h$—COOH or salt or activated form thereof, wherein $R^h$ comprises comprises an alkylene chain of at least 10 chain carbon atoms, more preferably at least 20 carbon atoms. In case $R^1$ comprises an alkylene chain of at least 10 chain carbon atoms, preferred number average molecular weights are from 300 g/mol to 15000 g/mol, more preferably, from 400 g/mol to 10000 g/mol, even more preferably, from 500 g/mol to 5000 g/mol, even more preferably, from 700 g/mol to 2.000 g/mol. More preferably, $R^h$ comprises —$CH_2C(CH_3)_2$— repeating units. More preferably the carboxylic acid (D) results from reaction of PIB (polyisobutylene) derivatives, specifically PIBSA (polyisobutylene succinic anhydride), for example PIBSA 1000.

The esterification in step (b) may be performed at temperatures of from 100 to 280° C., preferably from 110 to 260° C. and more preferably from 120 to 200° C., even more preferably from 130° C. to 170° C. The water formed is preferably distilled off. The reaction time is typically from 1 to 16 h, preferably from 2 to 8 h. The degree of condensation can be controlled in a simple manner through reaction temperature and time. Preferably, the reaction in step (b) is carried out under reduced pressure.

The esterification may preferably be carried out in the presence of an esterification catalyst. Suitable catalysts for esterification are known in the art and may be selected by the skilled artisan. Examples of catalysts comprise acids such as sulphuric acid, phosphoric acid, hypophosphoric acid, aluminium sulphate hydrate, acidic silica gel and acidic aluminium oxide. Moreover, it is possible to use aluminium compounds of the general formula $Al(OR)_3$ and titanium compounds of the general formula $Ti(OR)_4$, such as for example $Ti(OBut)_4$. Further details regarding a useful catalyst for step (b) are described for step (a). Also here methanesulphonic acid is preferred.

The weight average molar mass Mw of the resulting hyperbranched polyester mixture is from 500 to 200,000 g/mol, preferably from 1,000 to 100,000 g/mol and most preferably from 2,000 to 80,000 g/mol. The polyesters of the invention have a molecular weight Mn of from 300 g/mol to 50 000 g/mol, preferably from 500 g/mol to 20 000 g/mol, more preferably from 1000 g/mol to 10000 g/mol and very preferably 1000 g/mol to 8000 g/mol.

The Mw/Mn ratio typically is from 1 to 40, preferably from 1 to 20, more preferably from 1.6 to 10. The molecular weight is determined by gel permeation chromatographyin tetrahydrofuran (THF).

They are usually thus readily soluble; that is, clear solutions can be prepared with up to 50% by weight, in some cases even up to 80% by weight, of the polyesters of the invention in tetrahydrofuran (THF), n-butyl acetate, ethanol and numerous other solvents, without gel particles being detectable to the naked eye.

The OH number (according to DIN 53240, Part 2) typically is from 0 to 1000 mg KOH/g, preferably 0 to 200 mg KOH/g, most preferably 0 to 100 mg KOH/g. Preferably, the hyperbranched polyester mixture has an acid number of below 200 mg KOH/g, preferably in the range from 100 to 0 mg KOH/g.

The present invention further provides the hyperbranched polyester mixture obtainable by the method of the invention. Regarding the definition of the hyperbranched polymers see also: P. J. Flory, J. Am. Chem. Soc. 1952, 74, 2718 and A. Sunder et al., Chem. Eur. J. 2000, 6, No. 1, 1-8.

Hyperbranched polyesters for the purposes of this invention are noncrosslinked macromolecules containing hydroxyl and carboxyl groups that possess both structural and molecular non-uniformity. On the one hand they can be constructed starting from a central molecule, in the same way as dendrimers, but with a nonuniform branch chain length. On the other hand, they can also have a linear construction with functional, branched side groups, or else may have both linear and branched moieties as a combination of the two extremes. On the definition of dendrimeric and hyperbranched polymers see also P. J. Flory, J. Am. Chem. Soc., 1952, 74, 2718 and H. Frey et al., Chem. Eur. J., 2000, 6 (14), 2499.

By "highly branched" and "hyperbranched", in connection with the present invention, is meant that the degree of branching (DB), in other words the average number of dendritic linkages plus the average number of end groups per molecule, divided by the sum of the average number of dendritic linkages, the average number of linear linkages and the average number of end groups, multiplied by 100, is preferably 10% to 99.9%, more preferably 20% to 99%, even more preferably 20% to 95%.

By "dendrimeric" in the context of the present invention is meant that the degree of branching is 99.9%-100%. On the definition of the "degree of branching" see H. Frey et al., Acta Polym. 1997, (48), 30.

A further feature of the polyesters is that they can be noncrosslinked. "Noncrosslinked", for the purposes of this specification, means that there is a degree of crosslinking of less than 15% by weight, preferably of less than 10% by weight, determined via the insoluble fraction of the polymer.

The insoluble fraction of the polymer can be determined by extraction for four hours with the same solvent as used for the gel permeation chromatography, in other words a solvent selected from the group consisting of tetrahydrofuran, dimethylacetamide and hexafluoroisopropanol, depending on the solvent in which the polymer has the better solubility, in a Soxhlet apparatus and, after drying of the residue to a constant weight, the weighing of the residue that remains.

The synthesis reaction of this kind of polyester is accomplished by reaction of the carboxyl group of the oligohydroxycarboxylic acid (B) with one of the hydroxyl groups. In an ideal synthesis reaction, by esterification of n molecules of an oligohydroxycarboxylic acid (B) bifunctional in respect of hydroxyl groups, this would lead to a hyperbranched polyester having (n+1) hydroxyl groups and precisely one carboxyl group. In reality this ideal construction, however, is disrupted by etherification reactions of the hydroxyl groups, which is intend for the method of the present invention and by intramolecular esterification (lactone formation).

Lactone formation takes place through intramolecular reaction of a carboxyl group with a hydroxyl group, and as well as an irregular construction results in a reduction in the number of free carboxyl groups in the product. This reaction lowers the average carboxyl functionality of the product.

The hyperbranched polyester mixture of the invention are liquid or solid at room temperature (23° C.) and generally have a glass transition temperature of −50 to 120° C., preferably of −40 to 100° C. and more preferably of −30 to 80° C. Hyperbranched polyester mixture of this kind, constructed from aromatic oligohydroxycarboxylic acids, can have a glass transition temperature of up to 180° C.

The glass transition temperature Tg is determined by the DSC (Differential Scanning Calorimetry) method in accordance with ASTM 3418/82, with a heating rate of preferably 10° C./min.

The ether group, especially —$CH_2$—O—$CH_2$— content of the product can be determined by means of $^{13}$C-NMR spectroscopy at 100 MHz in $d_6$-DMSO. Thus, the $CH_2$-groups of the ether groups are shifted downfield in $^{13}$C-NMR in comparison to the $CH_2$-groups of the ester groups. For example, the $CH_2$-groups of the ether groups in the hyperbranched polyester of dimethylolbutyric acid appear approximately 2-10 ppm further downfield than the $CH_2$-groups of the ester groups, which appear at about 58-63 ppm.

Cyclic components of the hyperbranched polymer can likewise be detected in a particularly effective way by means of mass spectrometric methods, such as MALDI-TOF analysis, for example. For instance, hyperbranched polymers which comprise one ring per molecule, i.e. an intramolecular ether bond or an intramolecular ester bond (lactone), have a signal which is shifted by 18 mass units toward lower mass values in comparison to the main signal, since in comparison to the ring-free main signal they are produced as a result of the elimination of an additional molecule of water per macromolecule. Macromolecules with n rings per molecule, consequently, give a signal which is shifted by n*18 mass units toward lower mass values as compared with the main signal.

Use of the Hyperbranched Polyester Mixture

Use as Wax Inhibitor

In one embodiment of the invention, the above-detailed hyperbranched polyesters, are used to prevent wax deposits on surfaces in contact with, e.g., crude oil, mineral oil and/or mineral oil products, preferably for surfaces in contact with crude oil. The use is effectuated by adding at least one of the above-detailed hyperbranched polyester mixture to the crude oil, mineral oil and/or mineral oil products.

Accordingly, one aspect of the present invention is the use of a hyperbranched polyester mixture of the present invention as wax inhibitor.

Thus, another aspect of the invention is a method for the prevention of wax deposits on surfaces, comprising the step of adding a hyperbranched polyester mixture of the present invention to crude oil, mineral oil and/or mineral oil products.

For the use as additive to prevent wax deposits on surfaces, usually hyperbranched polyester mixtures comprising groups $R^{ha}$ should be used. Examples and preferred groups $R^{ha}$ have been mentioned above. In general, at least 30% of the 25 groups $R^h$ present in the hyperbranched polyester mixture should be groups $R^{ha}$, preferably at least 50%, more preferably at least 75%. In one embodiment hyperbranched polyester mixture comprising only groups $R^{ha}$ are used.

Preferred groups besides the groups $R^{ha}$ are groups $R^{hb}$ and/or $R^{hc}$. Preferably, the groups more preferably $R^{ha}$ have 16 to 40 carbon atoms, more preferably 16 to 28 carbon atoms.

For the inventive use, the hyperbranched polyester mixture can be used as such. Preference is given, however, to using formulations of the hyperbranched polyester mixture in suitable solvents which may comprise further components as well as the solvents. Examples of suitable solvents comprise hydrocarbons, in particular hydrocarbons having a boiling point of more than 110° C. Examples of such solvents comprise toluene, xylenes, or technical mixtures of high boiling aromatic solvents.

The concentration of an appropriate formulation may, for example, be 1 to 50% by weight, preferably 10 to 40% by weight of hyperbranched polyester mixture prepared in accordance with the invention and optionally further components except for the solvents, this figure being based on the total amount of all components including the solvents. While the formulations are naturally produced in a chemical plant, the ready-to-use formulation can advantageously be produced on site, i.e., for example, directly at a production site for oil.

Thus, another aspect of the present invention is a formulation comprising the hyperbranched polyester mixture of the present invention and a solvent.

The hyperbranched polyester mixture or formulations thereof are typically used in such an amount that the amount of the hyperbranched polyester mixture added is 50 to 3,000 ppm based on the oil. The amount is preferably 100 to 1,500 ppm, more preferably 250 to 600 ppm and, for example, 300 to 1,000 ppm. The amounts are based on the hyperbranched polyester mixture itself, not including any solvents present and optional further components of the formulation. The formulation of the hyperbranched polyester mixture in suitable solvents may comprise further components.

In a preferred embodiment of the invention, the oil is crude oil and the formulation is injected into a crude oil pipeline. The injection can preferably be effectuated at the oilfield, i.e. at the start of the crude oil pipeline, but the injection can of course also be effectuated at another site. More particularly, the pipeline may be one leading onshore from an offshore platform, especially when the pipelines are in cold water, for example having a water temperature of less than 10° C., i.e. the pipelines have cold surfaces.

In a further embodiment of the invention, the oil is crude oil and the formulation is injected into a production well. Here too, the production well may especially be a production well leading to an offshore platform. The injection is preferably effectuated approximately at the site where oil from the formation flows into the production well. In this way, the deposition of paraffins on surfaces can be prevented.

Use as Pour Point Depressants

The hyperbranched polyester mixture of the present invention may be used as pour point depressants for crude oil, mineral oil and/or mineral oil products, preferably as pour point depressant for crude oil by adding at least one of the hyperbranched polyester mixture detailed above to the crude oil, mineral oil and/or mineral oil products.

Thus, another aspect of the present invention is the use of a hyperbranched polyester mixture of the present invention as pour point depressant.

Thus, another aspect of the present invention is a method of reducing the pour point comprising the step of adding a hyperbranched polyester mixture of the present invention to crude oil, mineral oil and/or mineral oil products.

Pour point depressants reduce the pour point of crude oils, mineral oils and/or mineral oil products. The pour point ("yield point") refers to the lowest temperature at which a sample of an oil, in the course of cooling, still just flows. For the measurement of the pour point, standardized test methods are used. Preferred formulations have already been mentioned, and the manner of use is also analogous to the use as a wax inhibitor.

For use as pour point depressant, the formulation of the crude oil, mineral oil and/or mineral oil products in suitable solvents may comprise further components. For example, additional wax dispersants can be added to the formulation. Wax dispersants stabilize paraffin crystals which have formed and prevent them from sedimenting. The wax dispersants used may, for example, be alkylphenols, alkylphenol-formaldehyde resins or dodecylbenzenesulfonic acid.

Use in Lubricating Oils

The present invention is also directed to the use of the hyperbranched polyester mixture in lubricating oils by mixing (a) at least one base oil component, (b) the hyperbranched polyester mixture as defined herein, and (c) optionally other additives.

Thus, another aspect of the present invention is the use of a hyperbranched polyester mixture of the present invention in lubricating oils.

Thus, another aspect of the present invention is a method for preparing lubricating oil comprising the step of mixing (a) at least one base oil component, (b) the hyperbranched polyester mixture as defined herein, and (c) optionally other additives.

It furthermore relates to lubricating oil compositions comprising the crude oil, mineral oil and/or mineral oil products according to the present invention.

The lubricating oil compositions may comprise the following components:
(a) at least one base oil component,
(b) hyperbranched polyester mixture as defined herein, and
(c) optionally other additives.

For making the lubricating oil compositions the hyperbranched polyester mixture may be used as such. In an alternative embodiment a concentrate composition for use in lubrication oils comprising
(i) a diluent, and
(ii) from 30 to 70% by weight of the hyperbranched polyester mixture may be used.

The amounts of the hyperbranched polyester mixture of the present invention, the base oil component and the optional additive in the lubricating oil compositions are generally as follows:

In the most generic embodiment the amounts are from 0.1 to 30 weight percent of the hyperbranched polyester mixture, from 70 to 99.9 weight percent base oil, and, from 0.05 to 10 weight percent of additives.

Preferably, the amounts are from 0.5 to 25.0 weight percent of the hyperbranched polyester mixture, from 75 to 99.0 weight percent base oil, and, from 0.1 to 20 weight percent of additives.

More preferably, the amounts are from 1.0 to 20.0 weight percent of the hyperbranched polyester mixture, from 80.0 to 95.0 weight percent base oil, and from 0.5 to 15.0 weight percent of additives.

Most preferably, the amounts are from 1.5 to 15.0 weight percent of the hyperbranched polyester mixture, from 85.0 to 90.0 weight percent base oil, and from 0.8 to 15.0 weight percent of additives.

The weight ratio of the base oil component to the hyperbranched polyester mixture of the present invention in the lubricating oil compositions according to the present invention is generally in the range of from 4 to 1000, more preferably from 5 to 500, even more preferably from 8 to 200, and most preferably from 10 to 150.

In another preferred embodiment of the present invention, the lubricating oil composition contains from about 0.1 to 20.0 parts by weight, preferably 0.2 to about 15.0 parts by weight, and more preferably about 0.5 to about 10.0 parts by weight, of the neat hyperbranched polyester mixture (i.e. excluding diluent base oil) per 100 weights of base fluid. The preferred dosage will of course depend upon the base oil.

The lubricating oil compositions according to the present invention include at least one additive which is preferably selected from the group consisting of antioxidants, oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents. More preferred additives are described in more detail below.

The lubricating oil compositions according to the present invention are characterized by KRL shear stability as measured by the shear stability index based on DIN 51350-6, CEC L-45-99 mod. (20 h). The present invention has a shear loss less than 5%, preferably less than 3%, and more preferably less than 1% after 20 h.

In addition or alternatively, the lubricating oil compositions according to the present invention further display high viscosity index (VI) as measured by ASTM D2270.

Preferred viscosity index values of the lubricating oil compositions according to the present invention are at least 180, preferably at least 190, more preferably at least 200, even more preferably at least 205, and most preferably at least 210.

Additionally or alternatively, treat rates of the lubricant oil compositions according to the present invention can preferably be in some selected embodiments in the range of from 1.0 to 30.0, preferably from 2.0 to 25.0, more preferably from 2.5 to 15.0 and most preferably from 3.0 to 10.0 weight percent.

In summary, the lubricating oil compositions provide excellent viscosity characteristics at low and high temperatures and when subjected to high shear stress.

Base Oils

Preferred base oils contemplated for use in the lubricating oil compositions according to the present invention include mineral oils, poly-alpha-olefin synthetic oils and mixtures thereof. Suitable base oils also include base stocks obtained by isomerization of synthetic wax and slack wax, as well as base stocks produced by hydrocracking (rather than solvent extracting) the aromatic and polar components of the crude. In general, both the mineral and synthetic base oils will each have a kinematic viscosity ranging from about 1 to about 40 mm$^2$/s at 100 degrees centigrade, although typical applications will require each oil to have a viscosity ranging from about 1 to about 10 mm$^2$/s at 100 degrees centigrade.

The mineral oils useful in this invention include all common mineral oil base stocks. This would include oils that are naphthenic, paraffinic or aromatic in chemical structure. Naphthenic oils are made up of methylene groups arranged in ring formation with paraffinic side chains attached to the rings. The pour point is generally lower than the pour point for paraffinic oils. Paraffinic oils comprise saturated, straight chain or branched hydrocarbons. The straight chain paraffins of high molecular weight raise the pour point of oils and are often removed by dewaxing. Aromatic oils are hydrocarbons of closed carbon rings of a semi-unsaturated character and may have attached side chains. This oil is more easily degraded than paraffinic and naphthalenic oils leading to corrosive byproducts.

In reality a base stock will normally contain a chemical composition which contains some proportion of all three (paraffinic, naphthenic and aromatic). For a discussion of types of base stocks, see Motor Oils and Engine Lubrication by A. Schilling, Scientific Publications, 1968, section 2.2 thru 2.5.

The hyperbranched polyester mixture may be used in paraffinic, naphthenic and aromatic type oils. For example, the poly(meth)acrylate copolymer may be used in Groups I-V base oils. These Groups are well known by those skilled in the art. Additionally, the hyperbranched polyester mixture may be used in gas to liquid oils.

Gas to liquid oils (GTL) are well known in the art. Gaseous sources include a wide variety of materials such as natural gas, methane, C1-03 alkanes, landfill gases, and the like. Such gases may be converted to liquid hydrocarbon products suitable for use as lubricant base oils by a gas to liquid (GTL) process, such as the process described in U.S. Pat. No. 6,497,812, the disclosure of which is incorporated herein by reference.

Base oils derived from a gaseous source, hereinafter referred to as "GTL base oils", typically have a viscosity index of greater than about 130, a sulfur content of less than about 0.3 percent by weight, contain greater than about 90 percent by weight saturated hydrocarbons (isoparaffins), typically from about 95 to about 100 weight percent branched aliphatic hydrocarbons, have a pour point of below −15 to −20 C.

The GTL base oils may be mixed with more conventional base oils such as Groups I to V as specified by API. For example, the base oil component of the lubricant compositions may include 1 to 100 percent by weight to a GTL base oil.

Thus, a lubricating oil composition may be at least partially derived from a gaseous source and contain the instant hyperbranched polyester mixture as a pour point depressant.

Oils may be refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes. The preferred synthetic oils are oligomers of a-olefins, particularly oligomers of 1-decene, also known as poly-alphaolefins or PAO's.

The base oils may be derived from refined, re-refined oils, or mixtures thereof.

Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art.

Re-refined oils are obtained by treating used oils in processes similar to those used to obtain the refined oils. These re-refined oils are also known as reclaimed or reprocessed oils and are often additionally processed by techniques for removal of spent additives and oils breakdown products.

Optional Customary Oil Additives

The addition of at least one additional customary oil additive to the lubricating oil compositions of the present invention is possible but not mandatory in every case. The mentioned lubricant compositions, e.g. greases, gear fluids, metal-working fluids and hydraulic fluids, may additionally comprise further additives that are added in order to improve their basic properties still further.

Such additives include: further antioxidants or oxidation inhibitors, corrosion inhibitors, friction modifiers, metal passivators, rust inhibitors, anti-foamants, viscosity index enhancers, additional pour-point depressants, dispersants, detergents, further extreme pressure agents and/or antiwear agents.

Such additives can be present in the amounts customary for each of them, which range in each case from 0.01 to 10.0 percent by weight, preferably from 0.05 to 3.0 percent by weight, and more preferably from 0.1 to 1.0 percent by weight based on the total weight of the lubricating oil composition. Examples of further additives are given below:

1. Examples of Phenolic Antioxidants:

1.1. Alkylated monophenols: 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-ditert-butyl-4-isobutylphenol, 2,6-dicyclopentyl-4-methylphenol, 2-(alpha-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side chain, such as, for example, 2,6-dinonyl-4-methylphenol, 2,4-dimethyl-6-(1'-methyl-undec-1'-yl)-phenol, 2,4-dimethyl-6-(1'-methylheptadec-1'-yl)-phenol, 2,4-dimethyl-6-(1'-methyltridec-1'-yl)-phenol and mixtures thereof;

1.2. Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

1.3. Hydroquinones and alkylated hydroquinones: 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate;

1.4. Tocopherols: alpha-, beta-, gamma or delta-tocopherol and mixtures thereof (like for instance vitamin E);

1.5. Hydroxylated thiodiphenyl ethers: 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tertbutyl-2-methylphenol), 4,4'-thio-bis(3,6-di-sec-amylphenol), 4,4'-bis(2,6-dimethyl-4-hydroxy-phenyl)disulfide;

1.6. Alkylidene bisphenols: 2,2'-methylene-bis(6-tert-butyl-4-methylphenol), 2,2'-methylene-bis(6-tert-butyl-4-ethylphenol), 2,2'-methylene-bis[4-methyl-6-(alpha-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(alpha-methylbenzyl)-4-nonylphenol], 2,2'-methylene-bis [6-(alpha, alpha -dimethyl-benzyl)-4-nonylphenol], 4,4'-methylenebis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)dicyclopentadiene, bis[2-(3'-tertbutyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

1.7. O-. N- and S-benzyl compounds: 3,5,3',5'-tetra-tert-butyl-4,4'-dihydroxydibenzylether, octadecyl-4-hydroxy-3,5-dimethylbenzyl-mercaptoacetate, tridecyl-4-hydroxy-3,5-di-tert-butylbenzyl-mercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate;

1.8. Hydroxybenzylated malonates: dioctadecyl-2,2-bis (3,5-di-tert-butyl-2-hydroxybenzyl)malonate, dioctadecyl-2-(3-tert-butyl-4-hydroxy-5-methylbenzyl)malonate, di-dodecyl-mercaptoethyl-2,2-bis(3,5-di-tert-butyl-4-hydroxybenzyl) malonate, di[4-(1,1,3,3-tetramethylbutyl)-phenyl]-2,2-bis(3,5-di-tertbutyl-4-hydroxybenzyl)malonate;

1.9. Hydroxybenzyl aromatic compounds: 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol;

1.10. Triazine compounds: 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine,2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris (3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate;

1.11. Acylaminophenols: 4-hydroxylauric acid anilide, 4-hydroxystearic acid anilide, N-(3,5-di-tert-butyl-4-hydroxyphenyl)-carbamic acid octyl ester;

1.12. Esters of beta-(5-tert-butyl-4-hydroxy-3-methylphenyl) propionic acid: with polyhydric alcohols, e.g. with 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.13. Esters of beta-(3,5-di-tert-butyl-4-hydroxyphenyl) propionic acid,.gamma.-(3,5-dicyclohexyl-4-hydroxyphenyl) propionic acid, 3,5-di-tert-butyl-4-hydroxyphenylacetic acid: with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-hydroxyethyl oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.14. Amides of beta-(3,5-di-tert-butyl-4-hydroxyphenyl) propionic acid: N,N'-bis(3,5-ditert-butyl-4-hydroxyphenyl-propionypexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine;

1.15. Ascorbic acid (vitamin C);

1.16. Aminic antioxidants: N,N'-diisopropyl-p-phenylenediamine, N,N'-di-sec-butyl-pphenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'dicyclohexyl-p-phenylenediamine, N,N'-diphenyl-p-phenylenediamine, N,N'-di(naphth-2-yl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-pphenylenediamine, N-cyclohexyl-N'-phenyl-p-phenylenediamine, 4-(ptoluenesulfonamido)-diphenylamine, N,N'-dimethyl-N,N'-di-sec-butyl-pphenylenediamine, diphenylamine, N-allyldiphenylamine, 4-isopropoxydiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethyl phenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]-ethane, 1,2-di(phenylamino)propane, (o-tolyl)biguanide, di[4-(1',3'-dimethylbutyl)phenyl]amine, tert-octylated N-phenyl-1-naphthylamine, mixture of mono- and di-alkylated tert-butyl/tert-octyl-diphenylamines, mixture of mono- and di-alkylated nonyidiphenyl-amines, mixture of mono- and di-alkylated dodecyldiphenylamines, mixture of mono- and di-alkylated isopropyl/isohexyldiphenylamines, mixtures of mono- and di-alkylated tert-butyldiphenylamines, 2,3-dihydro-3,3-dimethyl-4H-1,4-benzothiazine, phenothiazine, mixture of mono- and dialkylated tert-butyl/tert-octyl-phenothiazines, mixtures of mono- and di-alkylated tertoctylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol. 2. Examples of further antioxidants: aliphatic or aromatic phosphites, esters of thiodipropionic acid or thiodiacetic acid or salts of dithiocarbamic acid, 2,2,12,12-tetramethyl-5,9-dihydroxy-3,7,11-trithiamidecane and 2,2,15,15-tetramethyl-5,12-dihydroxy-3,7,10,14-tetrathiahexadecane.

3. Examples of Metal Deactivators. e.g. for Copper:

3.1. Benzotriazoles and derivatives thereof: 2-mercaptobenzotriazole, 2,5-dimercaptobenzotriazole, 4- or 5-alkylbenzotriazoles (e.g. tolutriazole) and derivatives thereof, 4,5,6,7-tetrahydrobenzotriazole, 5,5'-methylene-bis-benzotriazole; Mannich bases of benzotriazole or tolutriazole, such as 1-[di(2-ethylhexyl)aminomethyl]tolutriazole and 1-[di(2-ethylhexyl)aminomethyl]benzotriazole; alkoxyalkylbenzotriazoles, such as 1-(nonyloxy-methyl)benzotriazole, 1-(1-butoxyethyl)-benzotriazole and 1-(1-cyclohexyloxybutyl)-tolutriazole;

3.2. 1,2,4-Triazoles and derivatives thereof: 3-alkyl-(or -aryl-) 1,2,4-triazoles, Mannich bases of 1,2,4-triazoles, such as 1-[di(2-ethylhexyl)aminomethyl]-1,2,4-triazole; alkoxyalkyl-1,2,4-triazoles, such as 1-(1-butoxyethyl)-1,2,4-triazole; acylated 3-amino-1,2,4-triazoles;

3.3. Imidazole derivatives: 4,4'-methylene-bis(2-undecyl-5-methyl) imidazole and bis[(N-methyl)imidazol-2-yl]carbinol-octyl ether;

3.4. Sulfur-containing heterocyclic compounds: 2-mercaptobenzothiazole, 2,5-dimercapto-1,3,4-thiadiazole, 2,5-dimercaptobenzothiadiazole and derivatives thereof; 3,5-bis[di(2-ethylhexyl)aminomethyl]-1,3,4-thiadiazolin-2-one;

3.5. Amino compounds: salicylidene-propylenediamine, salicylaminoguanidine and salts thereof.

4. Examples of Rust Inhibitors:

4.1. Organic acids, their esters, metal salts, amine salts and anhydrides: alkyl- and alkenylsuccinic acids and their partial esters with alcohols, diols or hydroxycarboxylic acids, partial amides of alkyl- and alkenyl-succinic acids, 4-nonylphenoxyacetic acid, alkoxy- and alkoxyethoxy-carboxylic acids, such as dodecyloxyacetic acid, dodecyloxy (ethoxy)acetic acid and amine salts thereof, and also N-oleoyl-sarcosine, sorbitan monooleate, lead naphthenate, alkenylsuccinic acid anhydrides, e.g. dodecenylsuccinic acid anhydride, 2-(2-carboxyethyl)-1-dodecyl-3-methyl-glycerol and salts thereof, especially sodium and triethanolamine salts thereof.

4.2. Nitrogen-containing Compounds:

4.2.1. Tertiary aliphatic or cycloaliphatic amines and amine salts of organic and inorganic acids, e.g. oil-soluble alkylammonium carboxylates, and 1-[N,N-bis(2-hydroxyethyl)amino]-3-(4-nonylphenoxy)propan-2-ol; 4.2.2. Heterocyclic compounds: substituted imidazolines and oxazolines, e.g. 2-heptadecenyl-1-(2-hydroxyethyl)-imidazoline;

4.2.3. Sulfur-containing compounds: barium dinonyinaphthalene sulfonates, calcium petroleum sulfonates, alkylthio-substituted aliphatic carboxylic acids, esters of aliphatic 2-sulfocarboxylic acids and salts thereof.

5. Examples of additional viscosity index enhancers: polyacrylates, polymethacrylates, nitrogen containing polymethylmethacrylates, vinylpyrrolidone/methacrylate copolymers, polyvinylpyrrolidones, polybutenes, polyisobutylenes, olefin copolymers such as ethylene-propylene copolymers, styrene-isoprene copolymers, hydrated styrene-isoprene copolymers, styrene/acrylate copolymers and polyethers. Multifunctional viscosity improvers, which also have dispersant and/or antioxidancy properties are known and may optionally be used in addition to the products of this invention.

6. Examples of pour-point depressants: polymethacrylates, ethylene/vinyl acetate copolymers, alkyl polystyrenes, fumarate copolymers, alkylated naphthalene derivatives.

7. Examples of dispersants/surfactants: polybutenylsuccinic acid amides or imides, polybutenylphosphonic acid derivatives, basic magnesium, calcium and barium sulfonates and phenolates.

8. Examples of extreme-pressure and anti-wear additives: sulfur- and halogen containing compounds, e.g. chlorinated paraffins, sulfurized olefins or vegetable oils (soybean oil, rape oil), alkyl- or aryl-di- or -tri-sulfides, benzotriazoles or derivatives thereof, such as bis(2-ethylhexyl)aminomethyl tolutriazoles, dithiocarbamates, such as methylene-bis-dibutyldithiocarbamate, derivatives of 2-mercaptobenzothiazole, such as 1-[N,N-bis(2-ethylhexyl)aminomethyl]-2-mercapto-1H-1,3-benzothiazole, derivatives of 2,5-dimercapto-1,3,4-thiadiazole, such as 2,5-bis(tert-nonyidithio)-1,3,4-thiadiazole.

9. Examples of coefficient of friction reducers: lard oil, oleic acid, tallow, rape oil, sulfurized fats, amides, amines. Further examples are given in EP-A-0 565 487.

10. Examples of special additives for use in water/oil metal-working fluids and hydraulic fluids: Emulsifiers: petroleum sulfonates, amines, such as polyoxyethylated fatty amines, non-ionic surface-active substances; buffers: such as alkanolamines; biocides: triazines, thiazolinones, tris-nitromethane, morpholine, sodium pyridenethiol; processing speed improvers: calcium and barium sulfonates.

The hyperbranched polyester mixture according to the present invention is useful as viscosity index improvers in lubricating oil compositions and may be admixed with a base oil and at least one of the above-mentioned additives to form the desired lubricating oil composition. It is also possible to first prepare a concentrate or a so-called "additive pack" comprising the desired spectrum of additives, which can then be subsequently diluted to give the working concentrations for the intended lubricating oil composition.

Lubricating oil compositions containing the hyperbranched polyester mixture of the present invention may be used in a number of different applications including automatic transmission fluids, manual transmission fluids, hydraulic fluids, greases, gear fluids, metal-working fluids, crankcase engine oil applications and/or shock absorber fluids.

The hyperbranched polyester mixture of the present invention is useful for the preparation of lubricating oil compositions which have special technical performance characteristics.

Most importantly, the rheology profiles at low temperatures, including the temperature dependency of the kinematic viscosity of the lubricating oil compositions of the present invention over a broad temperature range is excellent as derivable from measuring kinematic viscosity at different temperatures.

In summary, the temperature-dependent viscosity profile in combination with the high shear stability of the lubricating oil compositions according to the present invention represents an unusual spectrum of performance characteristics for a lubricating oil composition because these effects normally negatively affect each other.

The present invention is also directed to a method for improving the shear stability of a lubricating oil composition wherein the method comprises the step of providing the hyperbranched polyester mixture of the present invention and adding it to a base oil and optional additives to form a lubricating oil composition with improved shear stability.

Lubrication oils containing hyperbranched polyester mixture of the present invention may be used in automatic transmission fluids, manual transmission fluids, hydraulic fluids, greases, gear fluids, metal-working fluids, engine oil applications and shock absorber fluids.

The invention is illustrated in detail by the examples which follow.

EXAMPLES

Example 1

Modified hyperbranched polyester with chain extender
Polyester using trimethylolpropane, dimethylolpropionic acid, polyTHF 1000 and stearic acid Step 1: Synthesis of the Hyperbranched Polyester 2.01 g trimethylolpropane (0.015 mol), 402.30 g dimethylolpropionic aicd (3.0 mol), 20.22 g PolyTHF 1000 (BASF SE) (0.020 mol) and 1.27 g methanesulphonic acid (0.013 mol) were added to a 2 L reaction vessel equipped with N2 inlet, thermometer, stirrer and distillation column.

Step 2: Modification with Stearic Acid

In three steps 884.16 g stearic acid and methanesulphonic acid were added to the reaction mixture. After the first addition of 294.72 g (1.04 mol) stearic acid and 0.67 g methanesulphonic acid (0.0070 mol) the pressure of the reaction mixture was reduced to 600 mbar and the reaction mixture was kept under stirring at 150° C. until the acid number reached 45 mg KOH/g. After the second addition of 294.72 g stearic acid (1.04 mol) and 0.72 g methanesuphoric acid (0.0075 mol) the pressure was reduced to 200 mbar and the reaction mixture was kept under stirring at 150° C. until the acid number reached 36 mg KOH/g. After the third addition of 294.72 g (1.04 mol) stearic acid and 0.63 g methanesulphonic acid (0.0065mol) the pressure of the reaction mixture was reduced to 150 mbar and the reaction mixture was kept under stirring at 150° C. until the acid number reached 29 mg KOH/g.

A light brown material was collected.

Characterization Gel permeation chromatography in tetrahydrofuran (THF):
Mn: 2864 g/mol
Mw: 6467 g/mol
PDI: 2.26

Example 2

Polyester using trimethylolpropane, dimethylolpropionic acid, Polypropylenglycol 4000 and stearic acid Step 1: Synthesis of the Hyperbranched Polyester 2.01 g trimethylolpropane (0.015 mol), 402.30 g dimethylolpropionic aicd (3.0 mol), 80 g polypropylene glycol (4000 g/mol) (0.020 mol) and 1.27 g methanesulphonic acid (0.013 mol) were added to a 2 L reaction vessel equipped with N2 inlet, thermometer, stirrer and distillation column.

The reaction mixture was slowly heated with the help of an oil bad up to a temperature of 150° C. The reaction mixture was kept at 150° C. reduced pressure (800 mbar) until an acid number of 26 mg KOH/g was reached.

Step 2: Modification with Stearic Acid

In three steps 884.16 g stearic acid and methanesulphonic acid were added to the reaction mixture. After the first addition of 294.72 g (1.04 mol) stearic acid and 0.67 g methanesulphonic acid (0.0070 mol) the pressure of the reaction mixture was reduced to 800 mbar and the reaction mixture was kept under stirring at 150° C. until the acid number reached 43 mg KOH/g. After the second addition of 294.72 g stearic acid (1.04 mol) and 0.72 g methanesuphoric acid (0.0075mol) the pressure was kept at 800 mbar and the reaction mixture was kept under stirring at 150° C. until the acid number reached 36 mg KOH/g. After the third addition of 294.72 g (1.04 mol) stearic acid and 0.63 g methanesulphonic acid (0.0065 mol) the pressure of the reaction mixture was reduced to 500 mbar and the reaction mixture was kept under stirring at 150° C. until the acid number reached 23 mg KOH/g.

A light brown material was collected.

Example 3

Polyester using trimethylolpropane, dimethylolpropionic acid, Polypropylenglycol 2000 and stearic acid

Step 1: Synthesis of the Hyperbranched Polyester 2.01 g trimethylolpropane (0.015 mol), 402.30 g dimethylolpropionic aicd (3.0 mol), 40 g polypropylene glycol (2000 g/mol) (0.020 mol) and 1.27 g methanesulphonic acid (0.013 mol) were added to a 2 L reaction vessel equipped with N2 inlet, thermometer, stirrer and distillation column.

The reaction mixture was slowly heated with the help of an oil bad up to a temperature of 150° C. The reaction mixture was kept at 150° C. reduced pressure (800 mbar) until 23 ml of water were collected

Step 2: Modification with Stearic Acid

In three steps 884.16 g stearic acid and methanesulphonic acid were added to the reaction mixture. After the first addition of 294.72 g (1.04 mol) stearic acid and 0.67 g methanesulphonic acid (0.0070 mol) the pressure of the reaction mixture was reduced to 700 mbar and the reaction mixture was kept under stirring at 150° C. until the acid number reached 29 mg KOH/g. After the second addition of 294.72 g stearic acid (1.04 mol) and 0.72 g methanesuphoric acid (0.0075) the pressure was kept at 700 mbar and the reaction mixture was kept under stirring at 150° C. until the acid number reached 22 mg KOH/g. After the third addition of 294.72 g (1.04 mol) stearic acid and 0.63 g methanesulphonic acid (0.0065 mol) the pressure of the reaction mixture was reduced to 500 mbar and the reaction mixture was kept under stirring at 150° C. until the acid number reached 23 mg KOH/g.

A light brown material was collected.

Characterization Gel permeation chromatography in tetrahydrofuran (THF):

Mn: 3185 g/mol
Mw: 6645 g/mol
PDI: 2.08

Comparative Example 1

Modified hyperbranched polyester without chain extender
Polyester using trimethylolpropane, dimethylolpropionic acid and stearic acid (No chain extender)

Step 1: Synthesis of the Hyperbranched Polyester 2.01 g trimethylolpropane (0.015 mol), 402.30 g dimethylolpropionic aicd (3.0 mol), and 1.27 g methanesulphonic acid (0.013 mol) were added to a 2 L reaction vessel equipped with N2 inlet, thermometer, stirrer and distillation column.

The reaction mixture was slowly heated with the help of an oil bad up to a temperature of 150° C. The reaction mixture was kept at 150° C. for 17 hours until an acid number of 68 mg KOH/g was reached.

Step 2: Modification with Stearic Acid

In three steps 884.16 g stearic acid and methanesulphonic acid were added to the reaction mixture. After the first addition of 294.72 g (1.04 mol) stearic acid and 0.67 g methanesulphonic acid (0.0070 mol) the reaction mixture was kept under stirring at 150 C until the acid number reached 51 mg KOH/g. After the second addition of 294.72 g stearic acid (1.04 mol) and 0.72 g methanesuphoric acid (0.0075) the reaction mixture was kept under stirring at 140° C. until the acid number reached 57 mg KOH/g. After the third addition of 294.72 g (1.04 mol) stearic acid and 0.63 g methanesulphonic acid (0.0065 mol) the pressure of the reaction mixture was slowly reduced to 300 mbar and the reaction mixture was kept under stirring at 150° C. until the acid number reached 43 mg KOH/g.

A light brown material was collected.

Characterization Gel permeation chromatography in tetrahydrofuran (THF):

Mn: 2184 g/mol
Mw: 4605 g/mol
PDI: 2.1

Comparative Example 2

Boltorn H20 and stearic acid
(Boltorn H20 is a commercially available product; synthesis protocol according to WO 2013/019704 PCT/US2012/048786, Example 3)

34.8 g Boltorn H20 (0.020 mol) and 94 g stearic acid (0.330 mol) were added to a 250 mL reaction vessel equipped with N2 inlet, thermometer, stirrer and distillation column. 0.01 g of p-Toluenesulfonic acid were added to the reaction mixture, which was slowly heated with the help of an oil bad up to a temperature of 140° C. The reaction mixture was stirred for 1 h under normal pressure, then 7 hours under stirring at 140° C. under vacuum until the acid number of 13.9 mg KOH/g was reached.

Comparative Example 3:

Boltorn H2O and lauryl acid
(synthesis protocol from WO 2013/019704 PCT/US2012/048786, Example 1)

34.8 g Boltorn H2O (0.020 mol) and 66.0 lauryl acid (0.329 mol) were added to a 250 mL reaction vessel equipped with N2 inlet, thermometer, stirrer and distillation column. 0.01 g of p-Toluenesulfonic acid were added to the reaction mixture, which was slowly heated with the help of an oil bad up to a temperature of 140° C. The reaction mixture was stirred for 1 h under normal pressure, then 6 hours under stirring at 140° C. under vacuum until the acid number of 14.6 mg KOH/g was reached.

Comparative Example 4:

Boltorn H2O and palmitic acid
(synthesis protocol from WO 2013/019704 PCT/US2012/048786, Example 2)

34.8 g Boltorn H2O (0.020 mol) and 84.6 palmitic acid (0.329 mol) were added to a 250 mL reaction vessel equipped with N2 inlet, thermometer, stirrer and distillation column. 0.01 g of p-Toluenesulfonic acid were added to the reaction mixture, which was slowly heated with the help of an oil bad up to a temperature of 140° C. The reaction mixture was stirred for 1 h under normal pressure, then 7 hours under stirring at 140° C. under vacuum until the acid number of 17.5 mgKOH/g was reached.

Performance Tests as Pour Point Depressants

The pour point is determined by a Pour Point-Tester 45150 from PSL (Osterode am Harz, Germany). The measurement is carried out analogously to ASTM D5985. For the testing a Wintershall crude oil from the Landau region, Germany, is used with an API gravity of 37°.

A 2 L aluminum bottle containing the crude oil is heated up to 80° C. for 30 minutes in a water bath. 50 mL of the preheated crude oil are transferred to 100 mL plastic bottles and tempered again at 80° C. for 15 minutes. A 10% active solution of the additive (pour point depressant) in Solvesso 150 is dosed in the corresponding amount, to achieve final testing concentration (treat rate). The mixture of crude oil and additive is shaken strongly. Finally, the sample is tempered again at 80° C. for 15 minutes. Then approximately 30 ml of the sample are transferred to the cup of the pour point tester so that it is filled up to the calibration line. The cup is inserted into the pour point tester, the sensor head is put into the sample and the measuring is started.

| Sample | Concentration additive in ppm | No flow point[1] in ° C. | Pour point[1] in ° C. |
|---|---|---|---|
| Crude oil | — | 18.6 | 21 |
|  |  | 19.4 | 21 |
| With additive (Example 1) | 500 | 5.7 | 6 |
|  |  | 7.5 | 9 |
| With additive (Example 1) | 1000 | 4.4 | 6 |
|  |  | 5.0 | 6 |
| With additive (Example 2) | 500 | 10.1 | 12 |
| With additive (Example 2) | 1000 | 9 | 6, 7 |
| With additive (Example 3) | 500 | 7.5 | 9 |
| With additive (Example 3) | 1000 | 4.6 | 6 |

[1]duplicate

A reduction of the pour Point is observed, by adding pour point depressants from example 1, 2 and 3

| Sample | Concentration additive in ppm | No flow point[1] in ° C. | Pour point[1] in ° C. |
|---|---|---|---|
| Blank | — | 21.4 | 24 |
|  |  | 20.6 | 21 |
| Comp. Exa. 1 | 500 | 19.1 | 21 |
| Comp. Exa. 1 | 1000 | 15.2 | 18 |
| Comp. Exa. 2 | 500 | 20.4 | 21 |
| Comp. Exa. 2 | 1000 | 20.9 | 21 |
| Comp. Exa. 3 | 500 | 20.4 | 21 |
| Comp. Exa. 3 | 1000 | 20.9 | 21 |
| Comp. Exa. 4 | 500 | 16.7 | 18 |
| Comp. Exa. 4 | 1000 | 13.6 | 15 |

* sediment visible in the 10% active solution of reference 4

The absence of chain length extenders (like PolyTHF 1000) shows a negative influence on the solubility of the polymer in Solvesso 150.

Viscosity Ddetermination of Crude Oil Treated with Pour Point Depressants (PPD's) as a Function of the Temperature The viscosity as a function of the temperature is determined by a Haake RheoStress 1 rheometer (TCP/P, Thermofisher). For the testing a Wintershall crude oil from the Landau region, Germany, is used with an API gravity of 37°. The measurement is performed with the following parameters, because an ASTM or DIN does not exist:
start temp 70° C.
cooling rate 1° C./min
shear rate 10 s$^{-1}$
geometry: cone/plate C60/2° CS A 2 L aluminum bottle containing the crude oil is heated up to 80° C. for 30 minutes in a water bath. 50 mL of the preheated crude oil are transferred to 100 mL plastic bottles and tempered again at 80° C. for 15 minutes. A 10% active solution of the additive (pour point depressant) in Solvesso 150 is dosed in corresponding amount, to achieve final testing concentration (treat rate). The mixture of crude oil and additive is shaken strongly. Finally, the sample is tempered again at 80° C. for 15 minutes. Then approximately 3 ml of the sample are applied to the plate of the rheometer, so that it is fully wetted and the measurement is started. The measuring unit is covered, to prevent evaporation.

Rheology data: Temperature at which the viscosity of the oil reaches ~1000 mPas

| Samples | T@ 500 ppm | T@ 1000 ppm | T Raw oil (blank) |
|---|---|---|---|
| Example 1 | 11.1 (1010 mPas) | 3.6 (1020 mPas) | 22.6 (1020 mPas) |
| Example 2 | 20.7 (1020 mPas) | 12.6 (1010 mPas) | 23.1 (1020 mPas) |
| Example 3 | 21.8 (1020 mPas) | 15.8 (1030 mPas) | 23.0 (1020 mPas) |
| Comp. Exa. 1 | 26.5 (1040 mPas) | 20.4 (1010 mPas) | 24.8 (1040 mPas) |
| Comp. Exa. 2 | 25.6 (1040 mPas) | 23.0 (1020 mPa) | 24.8 (1040 mPas) |
| Comp. Exa. 3 | 24.6 (1020 mPas) | 23.7 (1010 mPas) | 24.8 (1040 mPas) |
| Comp. Exa. 4 | 23.2 (1050 mPas) | 24.7 (1010 mPas) | 26.4 (1060 mPas) |

The samples from the examples 1, 2 and 3 reach a viscosity of 1000 mPas at lower temperature with respect to the not-additivated oil (blank) and with respect to the comparative examples 1, 2, 3 and 4.

The invention claimed is:

1. A method for the preparation of a hyperbranched polyester mixture comprising the steps of:
    (a) reacting a hydroxyl group containing carboxylic acid (B) with at least one carboxylic acid group and at least two hydroxyl groups with a diol (C) having a molecular weight of more than 100 g/mol, in the presence of at least one further reactant, wherein the at least one further reactant is a polyol (A) having at least three hydroxyl groups under a reaction condition allowing ester and ether formation; and
    (b) reacting the mixture resulting from step (a) with a hydrophobic carboxylic acid (D) of the formula $R^h$—COOH, wherein $R^h$ is a hydrocarbon radical with at least 10 carbon atoms or an activated form thereof so that at least 30% of terminal OH groups are converted into hydrophobically modified OC(O)—$R^h$ groups resulting in the hyperbranched polyester mixture.

2. The method of claim 1, wherein the reaction condition in step (a) comprises a reaction temperature of more than 80° C.

3. The method of claim 1, wherein the reaction condition in step (a) comprises acidic conditions.

4. The method of claim 1, wherein the reaction condition in step (a) comprises a reaction temperature of more than 140° C. and is carried out in the presence of an acid.

5. The method of claim 1, wherein the molar ratio of carboxylic acid (B) and polyol (A), (B):(A), is from 1000:1 to 10:1.

6. The method of claim 1, wherein the molar ratio of carboxylic acid (B) and diol (C), (B):(C), is from 1000:1 to 10:1.

7. The method of claim 1, wherein the hyperbranched polyester mixture has an acid number of below 100 mg KOH/g.

8. The method of claim 1, wherein the hyperbranched polyester mixture has an acid number in the range from 50 to 0 mg KOH/g.

9. The method of claim 1, wherein the hyperbranched polyester mixture comprises a polyester showing a partial structure resulting from ether formation of at least one hydroxyl group of polyol (A) with at least one hydroxyl group of diol (C).

10. The method of claim 1, wherein the hyperbranched polyester mixture comprises a polyester showing a partial structure resulting from ester formation of at least one hydroxyl group of polyol (A) with the at least one carboxylic acid group of hydroxyl group containing carboxylic acid (B).

11. The method of claim 1, wherein the hyperbranched polyester mixture comprises a polyester showing a partial structure resulting from ether formation of at least one hydroxyl group of the hydroxyl group containing carboxylic acid (B) with at least one hydroxyl group of diol (C).

12. The method of claim 1, wherein the polyol (A) having at least three hydroxyl groups is a polyol (A) having three hydroxyl groups.

13. The method of claim 1, wherein the polyol (A) having at least three hydroxyl groups is a polyol (A) is 1,1,1-trimethylolpropane, glycerol or an alkoxylated derivative of 1,1,1-trimethylolpropane or glycerol.

14. The method of claim 1, wherein the polyol (A) having at least three hydroxyl groups is 1,1,1-trimethylolpropane.

15. The method of claim 1, wherein the hydroxyl group containing carboxylic acid (B) with at least one carboxylic acid group and at least two hydroxyl groups is a hydroxyl group containing carboxylic acid (B) with one carboxylic acid group and two hydroxyl groups.

16. The method of claim 1, wherein diol (C) is a polymeric diol.

17. The method of claim 1, wherein hydrophobic carboxylic acid (D) is represented by the formula Rh-COOH, wherein $R^h$ is an aliphatic, linear or branched, saturated or unsaturated, aromatic or non-aromatic hydrocarbon group having 10 to 32 carbon atoms.

18. A hyperbranched polyester mixture obtainable by a method of claim 1.

19. A wax inhibitor, a pour point depressant or a lubricant which comprises the hyperbranched polyester mixture of claim 18.

20. A lubricating oil composition comprising:
(a) at least one base oil component,
(b) hyperbranched polyester mixture obtainable by a method of
  (i) reacting a hydroxyl group containing carboxylic acid (B) with at least one carboxylic acid group and at least two hydroxyl groups with a diol (C) having a molecular weight of more than 100 g/mol, in the presence of at least one further reactant, wherein the at least one further reactant is a polyol (A) having at least three hydroxyl groups under a reaction condition allowing ester and ether formation: and
  (ii) reacting the mixture resulting from step (a) with a hydrophobic carboxylic acid
  (D) or an activated form thereof, wherein at least 30% of terminal OH groups are converted into hydrophobically modified groups resulting in the hyperbranched polyester mixture, and
(c) optionally other additives.

* * * * *